(12) United States Patent
Yang et al.

(10) Patent No.: US 7,776,945 B2
(45) Date of Patent: Aug. 17, 2010

(54) POLYESTER FIBER HAVING EXCELLENT LIGHT-SHIELDING AND FLAME RETARDANT CHARACTERISTIC AND TEXTILE GOODS USING THE SAME

(75) Inventors: Seung Cheol Yang, Anyang-Si (KR); Eung Soo Kim, Seoul (KR); Yang Kuk Son, Gunpo-Si (KR)

(73) Assignee: Hyosung Corporation, Seoul (KR)

( * ) Notice: Subject to any disclaimer, the term of this patent is extended or adjusted under 35 U.S.C. 154(b) by 162 days.

(21) Appl. No.: 11/792,680

(22) PCT Filed: Apr. 8, 2005

(86) PCT No.: PCT/KR2005/000985

§ 371 (c)(1),
(2), (4) Date: Mar. 17, 2008

(87) PCT Pub. No.: WO2006/070969

PCT Pub. Date: Jul. 6, 2006

(65) Prior Publication Data

US 2009/0043022 A1  Feb. 12, 2009

(30) Foreign Application Priority Data

Dec. 31, 2004  (KR) .................. 10-2004-0118131

(51) Int. Cl.
C08K 5/53 (2006.01)
(52) U.S. Cl. ..................... 524/117; 524/497
(58) Field of Classification Search ............. 524/117, 524/497
See application file for complete search history.

(56) References Cited

U.S. PATENT DOCUMENTS

| | | | |
|---|---|---|---|
| 3,941,752 A | 3/1976 | Kleiner et al. | |
| 4,035,442 A | 7/1977 | Dunworth | |
| 5,180,793 A | 1/1993 | Vigneault et al. | |
| 5,899,428 A | 5/1999 | Gauger | |
| 2005/0245647 A1* | 11/2005 | Masuda et al. | 524/115 |

FOREIGN PATENT DOCUMENTS

| | | | |
|---|---|---|---|
| CN | 1342222 A | | 3/2002 |
| EP | 1188848 A | * | 3/2002 |
| EP | 1371774 | * | 12/2003 |
| EP | 1479798 A1 | | 11/2004 |
| JP | 50-56488 | | 5/1975 |
| JP | 51-28894 | | 3/1976 |
| JP | 53-46398 | | 4/1978 |
| JP | 60-112849 A2 | | 6/1985 |
| JP | 62-6912 A | | 1/1987 |
| JP | 4-82911 A | | 3/1992 |
| JP | 4-82914 A | | 3/1992 |
| JP | 5-9536 A | | 1/1993 |
| JP | 8-322707 A | | 12/1996 |
| WO | WO-00/43578 A1 | | 7/2000 |
| WO | WO-03/071014 A | | 8/2003 |

* cited by examiner

*Primary Examiner*—Peter Szekely
(74) *Attorney, Agent, or Firm*—Birch, Stewart, Kolasch & Birch LLP

(57) ABSTRACT

Disclosed herein is a Polyester Fiber Having Excellent Light-Shielding and Flame Retardant Characteristic. The Polyester Fiber comprises: phosphorus-based flame retardant 0.05~5% by weight, based on phosphorus atom; and inorganic particles having 0.05~1 μm average particle size 1-5% by weight, based on fiber weight. Further disclosed is Textile Goods prepared from the Polyester Fiber. The polyester fiber according to the present invention is prepared from polyester polymer having Intrinsic viscosity of 0.55~0.75 dl/g and the Intrinsic viscosity difference of between the fiber and polymer (IV drop) is within 0.03 dl/g and it exhibits the excellent flame retardant and light shielding characteristic. Therefore, the polyester fiber can be applied to fiber for clothes, light shielding curtain for a car and blackout curtain for a house and theater.

4 Claims, No Drawings

POLYESTER FIBER HAVING EXCELLENT LIGHT-SHIELDING AND FLAME RETARDANT CHARACTERISTIC AND TEXTILE GOODS USING THE SAME

TECHNICAL FIELD

The present invention relates to a polyester fiber having excellent light shieldability and flame retardancy, and a fiber product using the same. More particularly, the present invention relates to a polyester fiber comprising 0.05 to 5% by weight of a phosphorus based flame retardant based on phosphorus atoms and 1 to 5% by weight of inorganic particles having an average particle diameter of 0.05 to 1 µm relative to the weight of the fiber, and a fiber product using the same.

BACKGROUND ART

In order to protect the body against risks such as fire, truly flame retardant fibers have been sought for a long time. In particular, a great deal of research and study has been directed at the development of fiber products capable of impeding the spread of fire or flame retardant products for the elderly and feeble suffering from difficulty to take refuge in the event of fire.

In addition, a variety of blackout curtains have been developed to prevent elevation of indoor temperature by blocking sunlight. A great deal of efforts have been made to develop blackout curtains made up of woven or knitted fabrics using fiber materials, blackout curtains fabricated from inorganic films and the like. Recently, since UV light has been discovered to be the primary cause of skin cancers, various methods have been proposed to block UV light.

There are various methods to prepare multi-functional products exerting functions such as flame retardancy, light shielding or the like, suited for the above-mentioned purposes. Firstly, mention may be made of a method for preparing a product using metal plates. In this case, the resulting products exhibit excellent performance such as complete incombustibility and perfect blockage of sunlight, but unfortunately may cause injury such as burns, due to an elevated temperature resulting from heat generated by energy of blocked sunlight.

As to another method, there is a preparation method using films made of organic materials. In the case of using organic films, it is possible to fabricate a larger variety of structures as compared to the use of metal plates, but there is a limit to the thickness of the prepared products. In addition, films made from such organic materials are unpleasant to the touch and exhibit poor drapeability.

Therefore, the present invention proposes a process for preparing a fiber product having excellent tactility and light shieldability and convenient handling ability using fibers simultaneously exhibiting flame retardancy and light shieldability.

Methods of imparting flame retardancy to the fiber may be broadly divided into a method involving flame retardancy processing and a method involving making fiber materials flame retardant, thereby imparting permanently flame retardant materials. The method using flame retardancy processing to impart flame retardancy has been conventionally performed on natural fibers such as cotton and is also employed in the production of flame retardant synthetic fibers. However, the method of imparting flame retardancy via post-processing presents problems associated with durability, and occurrence of environmental problems due to waste water generated during processing. As such, this method continues to be phased out.

In addition, as to the method involving rendering fiber materials permanently flame retardant, a method of imparting flame retardancy by copolymerization is primarily employed. For this purpose, reactive copolymerizable flame retardants are also variously commercialized.

Methods of forming flame retardant polyesters via copolymerization largely rely upon bromine (Br)-based flame retardants and phosphorus (P)-based flame retardants. As to patented inventions using bromine-based flame retardants, reference is made to Japanese Patent Publication Laid-open Nos. Sho 62-6912, 53-46398 and 51-28894. In this connection, bromine based compounds are susceptible to thermal degradation at high temperatures, and thus, a large quantity of flame retardants must be added in order to achieve effective flame retardancy. As a result, color and light fastness of the resulting polymeric material are deteriorated. In addition, due to the recent presentation of the possibility that bromine based flame retardants may give off carcinogenic substances such as dioxin and benzofuran, there is a movement towards regulation of brominated flame retardants, thereby actively facilitating substitution with the phosphorus based flame retardants.

As to patented inventions using phosphorus-based flame retardants, reference is made to U.S. Pat. Nos. 3,941,752, 5,899,428 and 5,180,793, and Japanese Patent Publication Laid-open No. Sho 50-56488. Reactive flame retardants disclosed in these patents have disadvantages such as deterioration of physical properties due to hydrolysis upon post-processing, in particular dyeing polyester fibers, because phosphorus atoms are bound to a main chain or backbone of the polymer.

On the other hand, flame retardant polyester fibers prepared using the above-mentioned patent methods lack UV stability and thus suffer from deterioration of flame retardancy/durability and physical properties of the fibers upon prolonged exposure to sunlight.

In this connection, Japanese Patent Publication Laid-open No. Hei 5-9536 has proposed a method of preparing fiber products for blocking sunlight by adding 2 to 39% by weight of inorganic fine particles having a particle size of not more than 5 µm in order to prepare a light shield for automobiles.

However, the light shield for automobiles prepared by such a method has no flame retardancy imparted by fiber per se. As such, the fiber must be subjected to post-processing if a flame retardant fiber is desired.

SUMMARY OF THE INVENTION

Therefore, the present invention has been made in view of the above problems, and it is an object of the present invention to provide a permanently flame retardant polyester fiber having high sunlight blocking efficiency, and a fiber product using the same.

In accordance with an aspect of the present invention, the above and other objects can be accomplished by the provision of a polyester fiber, comprising 0.05 to 5% by weight of a phosphorus based flame retardant based on phosphorus atoms and 1 to 5% by weight of inorganic fine particles relative to the weight of the fiber, and having particle size distribution of the inorganic fine particles satisfying the following inequality (1):

$$0.05\ \mu m \leq d_{50} \leq 1\ \mu m,\ B_{90/10} \leq 0.5\ \mu m \qquad [1]$$

wherein $d_{50}$ is an average particle diameter of inorganic fine particles, and $B_{90/10}$ is a difference in the particle diameter between the top 90% of total particle diameters and the bottom 10% of total particle diameters.

In accordance with another aspect of the present invention, there is provided a fiber product prepared using the above-mentioned flame retardant polyester fiber.

In accordance with a further aspect of the present invention, there is provided a blackout curtain prepared using the above-mentioned flame retardant polyester fiber.

In accordance with yet another aspect of the present invention, there is provided a process for preparing a polyester fiber, comprising separately introducing phosphorus based flame retardant and inorganic fine particles to a reactor.

DISCLOSURE OF THE INVENTION

Now, the present invention will be described in more detail.

The present inventors have extensively and intensively conducted various experiments in order to simultaneously impart flame retardancy and light shieldability and found that it is most suitable to use a phosphorus based flame retardant in an amount of 0.05 to 5% by weight based upon phosphorus atoms, in order to impart flame retardancy and it is most suitable to add inorganic fine particles having an average particle diameter of 0.05 to 1 μm in an amount of 1 to 5% by weight, in order to impart light shieldability. The method of separately or simultaneously imparting flame retardancy and light shieldability will now be described.

Impartment of Flame Retardancy

The present inventors have conducted tests on a variety of flame retardants in order to impart permanent flame retardancy to polyester fibers. Currently, flame retardants, which are industrially used to impart flame retardancy, are broadly classified into halogen based flame retardants and phosphorus based flame retardants. The halogen based flame retardants are known to exhibit superior flame retardancy to the phosphorus based flame retardants, but the halogen based flame retardants, represented primarily by bromine, give off carcinogenic substances such as dioxin upon burning and thus regulations on use thereof are gradually being instituted. In addition, the phosphorus based flame retardants are broadly divided into main-chain type flame retardants in which flame retardancy-imparting phosphorus atoms are directly attached to polyester backbones and side-chain type flame retardants in which phosphorus atoms are attached to polyester backbones via side chains.

The present inventors have discovered a flame retardant represented by the following general formula 1, as a side-chain type flame retardant that is environmentally friendly and exhibits excellent resistance to hydrolysis.

Formula 1

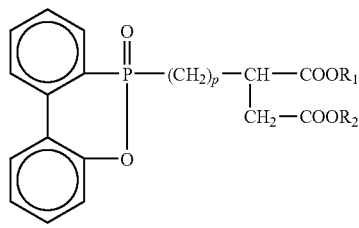

wherein $R_1$ and $R_2$ are independently hydrogen or a different or same radical having a ω-hydroxyl group and containing 2 to 4 carbon atoms, and p is an integer between 1 and 5.

The side-chain type flame retardant represented by the formula I has reactive groups capable of undergoing esterification or transesterification in its own molecular structure and thus is co-polymerizable with polyethylene terephthalate.

The content of the flame retardant of formula I in the polymer is in the range of 500 to 50,000 ppm, and more preferably 1,000 to 20,000 ppm, based on phosphorus atoms. Where the phosphorus atom content is less than 500 ppm, desired flame retarding effects cannot be obtained. In contrast, the phosphorus atom content greater than 50,000 ppm undesirably results in difficulty to increase the degree of polymerization of the resulting polyester and remarkably reduces crystallinity, thereby making it difficult to produce fibers or films.

Further, the present invention is intended for light shielding, and thus stability of the polymer upon exposure to sunlight, in particular UV light, is of primary importance. As such, UV stability is certainly necessary and thereby it is important to add a UV stabilizer. As a result of various tests, the present inventors have found that manganese phosphate is most effective. However, manganese phosphate is insoluble in ethylene glycol, thereby making it difficult to be incorporated into the polymer. Therefore, the present inventors have found that it is most proper to synthesize manganese phosphate in a reaction system by separately introducing manganese acetate and phosphoric acid to the reactor, instead of directly introducing manganese phosphate into a reactor. The content of manganese acetate utilized for synthesis of manganese phosphate is preferably in the range of 0.1 to 500 ppm, and more preferably 0.2 to 200 ppm, based on manganese atoms in the polymer. If the content of manganese acetate is below 0.1 ppm, it is difficult to obtain the desired UV stability. If the content of manganese acetate exceeds 500 ppm, problems associated with dispersibility arise, thereby leading to increased pack pressure upon spinning. In addition, the content of phosphoric acid is preferably in the range of 0.1 to 500 ppm, and more preferably 0.2 to 200 ppm based on the phosphorus atom content relative to the polymer. Although phosphorus based materials may be added in any amount, so long as the reaction between the phosphorus material and the manganese salt is not inhibited, concentrations greater than 500 ppm may lead to decreased catalytic activity, thereby it making difficult to prepare the desired flame retardant polyester.

Impartment of Light Shieldability

The present inventors have conducted tests on various additives for fibers, in order to determine materials suitable for imparting light shieldability to polyester fibers, and found that inorganic fine particles are most suitable. Most organic additives are not stable at temperatures higher than 250° C. at which polyester polymerization, spinning processes, and the like are carried out. Further, it was found that even if the organic additives are stable at such temperatures, they are inapplicable to industrial scale processes due to the high cost thereof, or processability is lowered by phase separation due to very low affinity for polyesters.

Therefore, the present inventors have selected and tested various kinds of inorganic fine particles, including, for example, titanium dioxide, barium sulfate, alumina, silica, zinc oxide, magnesium oxide and magnesium sulfate. Briefly reviewing the test results and characteristics, industrially utilizable alumina has a particle size of more than 5 μm that is too large and thus contributes to increased-pack pressure upon spinning, thereby deteriorating processability. Silica has a low shading rate and thus needs to be added in an amount of more than 5% by weight in order to achieve effective shading, thereby resulting in problems associated with polymerization processability and high production costs. Zinc oxide has high depolymerization activity and thus it is difficult to increase viscosity in a polycondensation process. Magnesium oxide exhibits a severe increase in melt viscosity due to a chelate linkage between magnesium and an ester bond in the polyester backbone, thus making it difficult to form into fibers. Magnesium sulfate, utilized as a dehumidifying agent, exhibits severe agglomeration, and thus difficulty of application because exchange cycle of a oligomer or polymer filter becomes too short in a terephthalic acid (hereinafter, referred to as "TPA") polymerization process using TPA as a main material. Finally, barium sulfate has a refractive index of 1.54 similar to that of polyester (1.47) and thus it is difficult to improve shieldability. Therefore, the present inventors have confirmed that titanium dioxide is most suitable as primary inorganic fine particles in the present invention.

Since inorganic fine particles selected for use in the present invention are not solubilized in TPA and ethylene glycol (hereinafter; referred to as "EG"), utilized in polyester polymerization as major and minor materials, a flame retardant utilized in the present invention and mixtures thereof, and also in the reaction products, oligomers or polymers, a particle size thereof is very important. The average particle diameter of the inorganic fine particles suitable for use in the present invention preferably satisfies the following inequality (1):

$$0.05 \; \mu m \leq d_{50} \leq 1 \; \mu m, B_{90/10} \leq 0.5 \; \mu m \quad [1]$$

wherein $d_{50}$ is an average particle diameter of inorganic fine particles, and $B_{90/10}$ is a difference in the particle diameter between the top 90% of total particle diameters and the bottom 10% of total particle diameters.

Where the average particle diameter of inorganic fine particles is less than 0.05 μm, the particle diameter is too small as compared to a wavelength of light. As such, light shielding efficiency cannot be sufficiently exerted. In addition, when band gap energy is small and thus characteristics of n-type semiconductor are exhibited as shown in the case of titanium dioxide or zinc oxide, polymer or fiber decomposition occurs due to photocatalytic effects. Titanium dioxide or zinc oxide has band gap energy of 3.2 eV (electron volts), which thus enables organic materials to be decomposed by near UV light with a wavelength of about 350 nm. Therefore, if the particle diameter of inorganic fine particles becomes too small, this may cause damage to stability of polymers and fibers. In contrast, when the average particle diameter of inorganic fine particles exceeds 1 μm, this results in difficulty to prepare a microfiber having single filament fineness of not more than 1 denier and may become a primary cause of increase in pack pressure. In addition, if $B_{90/10}$ representing the particle diameter distribution is greater than 0.5 μm, coarse particles present in inorganic fine particles may cause lowering of processability.

Further, inorganic fine particles in accordance with the present invention are preferably added in an amount of 1 to 5% by weight. If the amount of particles added is less than 1% by weight, the desired light shieldability cannot be exhibited. Whereas, a particle content exceeding 5% by weight results in poor polymerization, poor spinning processability, and yellowing of the polymers and thus-prepared fibers due to sunlight.

Simultaneous Impartment of Flame Retardancy and Light Shieldability

A method for simultaneous impartment of flame retardancy and light shieldability is carried out by combined application of the above-mentioned two separate methods for imparting flame retardancy and light shieldability functions. However, it is difficult to achieve the above-mentioned objects simply by concurrently introducing additives. For simultaneous impartment of both functions, a polymer having physical properties suitable for fibers should be prepared by inhibiting aggregation of inorganic fine particles.

Similar to the case of a flame retardant imparting flame retardancy, represented by general formula 1, when an excess of inorganic fine particle is administered, reaction rate slows, thus lowering polymerization rate of the polymer. This in turn leads to aggregation of inorganic fine particles. As such, in order to resolve these problems, the present inventors have employed the following method.

First, the flame retardant of general formula I and inorganic fine particles are separately introduced to a reactor. Since these two materials are introduced to the reactor after dissolving in EG or dispersing in EG, simultaneous addition of both materials together with EG tends to cause aggregation of inorganic fine particles due to the high acidity of the flame retardant solution. In addition, simultaneous addition of materials to the reactor produces pressure in a reflux tower, thereby inhibiting smooth reflux, due to the concentration of EG. Therefore, the polymerization reaction in the present invention is carried out such that the flame retardant and inorganic fine particles are not simultaneously added. For example, if inorganic fine particles are added to a slurry of TPA and EG, the flame retardant solution is added to a polycondensation reactor, or if the flame retardant solution is added to the slurry of TPA and EG, inorganic fine particles are added to the polycondensation reactor or they are added to the polycondensation reactor to which completely esterified oligomers were transferred at a time interval of minimum 5-minute difference.

In addition, the polyester polymer prepared in the present invention is prepared using a conventional polyester melt polymerization apparatus and is characterized by an intrinsic viscosity of 0.55 to 0.75 dl/g. If the intrinsic viscosity is lower than 0.55 dl/g, physical properties of the resulting fibers are too poor. In contrast, if the intrinsic viscosity is higher than 0.75 dl/g, it is difficult to prepare the polymer by melt polymerization and the polymer can be prepared only by solid phase polymerization. If a polymer having an intrinsic viscosity of 0.55 to 0.75 dl/g is used, flame retardant polyester fiber products exhibiting sufficient physical properties, as is the aim of the present invention, are obtained.

When fibers are prepared using the polyester polymers having the intrinsic viscosity of 0.55 to 0.75 dl/g, the intrinsic viscosity of the fibers varies depending upon spinning conditions. This phenomenon, generally referred to as intrinsic viscosity (IV) drop, can be defined by the following equation 2:

$$\text{Intrinsic Viscosity drop(IV drop)} = \text{Intrinsic viscosity of polymer} - \text{Intrinsic viscosity of fibers} \quad [2]$$

Typically, the smaller the intrinsic viscosity drop, the better the processability and dyeability of the prepared fibers. In addition, the intrinsic viscosity drop will vary depending upon spinning conditions, in particular spinning temperature. Therefore, it is an object of the present invention to prepare flame retardant polyester fibers having an intrinsic viscosity drop of 0.03 dl/g or less. Where the intrinsic viscosity drop is greater than 0.03 dl/g, heterogeneous dyeing, referred to as "rain drop", is likely to occur in fiber products.

Meanwhile, the flame retardant polyester fibers in accordance with the present invention are applicable to fiber products such as garments, shade curtains for automobiles or blackout curtains for use in domestic or public places such as theaters.

EXAMPLES

Now, constitution and effects of the present invention will be described in more detail with reference to the following Examples and Comparative Examples. These examples are provided only for illustrating the present invention and should not be construed as limiting the scope and spirit of the present invention.

Analysis of physical properties in the following examples will be performed as follows.

1. Inherent Viscosity (IV)

Polymers were dissolved in a mixed solution of phenol and 1,1,2,2-tetrachloroethane (6:4 by weight) and the inherent viscosity of the polymers was determined at 30° C. using an Ubbelohde tube.

2. Particle Diameter of Inorganic Fine Particles $d_{50}$ and $B_{90/10}$ were analyzed by dispersing inorganic fine particles in water or an alcohol and then determining particle diameter using Malvern Instruments (available from Malvern).

3. Dispersibility of Inorganic Fine Particles

Dispersibility of inorganic fine particles was determined as follows. 10 polymer samples, prepared according to a test method, were taken and microtomed, followed by photographing sections of particles. Then, an image analyzer was used to determine the particle diameter of dispersed inorganic fine particles. In particular, dispersibility was considered poor if inorganic fine particles having a particle diameter greater than 2 μm were present. Polymers having such a particle size were not spun.

4. Spinnability

Polymers, prepared according to a test method, were dried to a moisture regain of not more than 30 ppm in a vacuum dryer, and then were spun using an extruder with an inner diameter of 95 mm, followed by recording increase in spinning pack pressure. When the increase rate of pack pressure exceeded 100 kP/day, spinning was stopped. In addition, if the end breakage rate was greater than 5, as calculated on the basis of the rate/line/day, spinning was stopped.

5. Strength and Elongation of Fibers

These properties were analyzed using a Universal Testing Machine (UTM) (available from INSTRON).

6. Yellowing by Sunlight

In order to determine the effects of sunlight by inorganic fine particles, the prepared polymers were placed in a row on a glass plate and exposed to UV radiation produced by a QUV (available from Q-Panel) for 48 hours. On the basis of the La-b system using a color difference meter, when changes in the b* value, denoting the degree of yellowing, were greater than 1.5, polymers were determined to undergo yellowing.

7. Flame Retardancy

The prepared fibers were tested according to Korean Standard, KS M 3092, in order to evaluate LOI (Limited Oxygen Index).

8. Light Shieldability

The prepared fiber products were evaluated according to Japanese Standard, JIS L 1055, in order to determine the shading rate.

Example 1

Titanium dioxide inorganic fine particles having a $d_{50}$ of 0.3 μl and a $B_{90/10}$ of 0.22 μm were dispersed in ethylene glycol (hereinafter, referred to as "EG") to prepare a 20% dispersion of titanium dioxide. 1250 g of the prepared titanium dioxide dispersion was added to a slurry of 8650 g of terephthalic acid (hereinafter, referred to as "TPA") and 2700 g of EG, and the resulting mixture was subjected to esterification using a semi-batch process. Oligomers containing 2.5% by weight of titanium dioxide used in the slurry were stirred in the esterification reactor while the temperature of the esterification reactor was maintained at 250 to 260° C. After completion of slurry administration, esterification was further progressed for 30 minutes, thereby reaching an esterification reaction rate of 96.5%. The prepared oligomers were transferred to a polycondensation reactor. As the flame retardant, a solution in which 65% by weight of a compound of general formula I (wherein p is 1, $R_1$ and $R_2$ are $CH_2CH_2OH$) was dissolved in EG, was used. 1380 g of the flame retardant solution was added, and then manganese acetate and phosphoric acid, as UV stabilizers, were added to concentrations of 44 ppm and 75 ppm, respectively, based on manganese and phosphorus atoms. Next, as a catalyst, 200 g of a solution in which 2% by weight of antimony trioxide had been dissolved in EG was added and subjected to vacuum. A conventional polyester polymerization method was used to perform polycondensation, thereby obtaining polymers having an intrinsic viscosity of 0.65 dl/g, the physical properties of which were then evaluated. Results are shown in Table 1.

Example 2 and Comparative Examples 1 Through 5

These example were carried out using the same procedure as in Example 1, except that various kinds of inorganic fine particles listed in Table 1 below were used as the inorganic fine particles. The results thus obtained are shown in Table 1.

Example 3

Titanium dioxide inorganic fine particles having a $d_{50}$ of 0.3 μm and a $B_{90/10}$ of 0.22 μm were dispersed in EG to prepare a 20% dispersion of titanium dioxide. A slurry of 8650 g of TPA and 3700 g of EG was subjected to esterification using a semi-batch process. Oligomers containing no titanium dioxide were stirred in the esterification reactor while the temperature of the esterification reactor was maintained at 250 to 260° C. After completion of slurry administration, esterification was additionally progressed for 30 minutes, thereby reaching an esterification reaction rate of 96.5%. The prepared oligomers were transferred to a polycondensation reactor. As the flame retardant, a solution in which 65% by weight of a compound of general formula I (wherein p is 1, $R_1$ and $R_2$ are $CH_2CH_2OH$) was dissolved in EG, was used. 1380 g of the flame retardant solution was added, and then manganese acetate and phosphoric acid, as UV stabilizers, were added to concentrations of 44 ppm and 75 ppm, respectively, based on manganese and phosphorus atoms. As a color matching agent, cobalt acetate was added to a concentration of 5 ppm based on cobalt atoms and as a catalyst, 200 g of a solution in which 2% by weight of antimony trioxide was dissolved in EG was added. After 5 minutes, 1250 g of the prepared titanium dioxide dispersion was added. Next, added EG was removed with stirring and vacuum was applied. A conventional polyester polymerization method was used to perform polycondensation, thereby obtaining polymers having an IV of 0.64 dl/g, the physical properties of which were then evaluated. Results are shown in Table 1.

Comparative Example 6

Titanium dioxide inorganic fine particles having a $d_{50}$ of 0.3 μm and a $B_{90/10}$ of 0.22 μm were dispersed in EG to prepare a 20% dispersion of titanium dioxide. A slurry of 8650 g of TPA and 3700 g of EG was subjected to esterification using a semi-batch process. Oligomers containing no titanium dioxide were stirred in the esterification reactor while the temperature of the esterification reactor was maintained at 250 to 260° C. After completion of slurry administration, esterification was further progressed for 30 minutes, thereby reaching an esterification rate of 96.5%. The prepared oligomers were transferred to a polycondensation reactor. As the flame retardant, a solution in which 65% by weight of a compound of general formula (wherein p is 1, $R_1$ and $R_2$ are $CH_2CH_2OH$) was dissolved in EG, was used. 1380 g of the flame retardant solution and 1250 g of titanium dioxide dispersion were mixed and added, and then manganese acetate, cobalt acetate and phosphoric acid, were added to concentrations of 44 ppm, 5 ppm and 75 ppm, respectively, based on manganese, cobalt and phosphorus atoms. As the catalyst, 200 g of a solution in which 2% by weight of antimony trioxide was dissolved in EG was added and subjected to vacuum. A conventional polyester polymerization method was used to perform polycondensation, thereby obtaining polymers having an IV of 0.64 dl/g, the physical properties of which were evaluated. Results are shown in Table 1.

Example 5

Polymers prepared in Example 1 were dried in a vacuum dryer for 24 hours. Dried polymers were extruded to prepare partially oriented fibers of 120 denier/72 filaments using an extruder with an inner diameter of 95 mm, at a first godet roller speed of 3140 m/min and a second godet roller speed of 3150 m/min, at a temperature of 280° C. The prepared partially oriented yarns were drawn at a draw ratio of 1.6, a hot roller temperature of 90° C. and a hot plate temperature of 135° C., thereby preparing drawn yarns. The thus-prepared fibers and conventional flame retardant polyester 75 denier/36 filament yarns, as weft and warp, respectively, were used to weave fabrics which were then evaluated on flame retardancy and light shieldability. The results are as follows:

Strength: 4.3 g/d
Elongation: 34%
Shading rate: 99.8%
LOI: 31

TABLE 1

|  | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Fine particles*[1] | $TiO_2$ | $TiO_2$ | $TiO_2$ | $TiO_2$ | $TiO_2$ | $TiO_2$ | MgO | $BaSO_4$ | $TiO_2$ |
| Particle content*[2] | 2.5 | 2.5 | 2.5 | 7.0 | 1.5 | 2.5 | 2.5 | 2.0 | 2.5 |
| $d_{50}$ | 0.3 | 0.5 | 0.3 | 0.3 | 0.01 | 0.5 | 0.5 | 0.15 | 0.3 |
| $B_{90/10}$ | 0.22 | 0.31 | 0.22 | 0.22 | 0.55 | 0.71 | 0.38 | 0.28 | 0.22 |
| IV | 0.65 | 0.64 | 0.64 | 0.64 | 0.65 | 0.64 | 0.52 | 0.64 | 0.64 |
| Dispersibility | ◎ | ○ | ◎ | ○ | ◎ | X | ◎ | ◎ | X |
| Yellowness | ◎ | ◎ | ◎ | X | X | X | ◎ | ◎ | ◎ |

*[1]Abbreviation: $TiO_2$ (titanium dioxide), $BaSO_4$ (barium sulfate), MgO (magnesium oxide)
*[2]Fine particle content: % weight relative to polymer

Example 4 and Comparative Example 7

Polymers prepared in Example 1 and Comparative Example 5 were dried in a vacuum dryer for 24 hours. Dried polymers were extruded using an extruder with an inner diameter of 95 mm, at a spinning temperature of 280° C. This was followed by a direct spinning/draw process at 1350 m/min through a first godet roller heated to 80° C., and at 4100 m/min through a second godet roller heated to 120° C., thereby preparing fibers of 75 denier/72 filaments. The thus-prepared fibers and conventional flame retardant polyester 75 denier/36 filament yarns were used as fabric weft and warp, respectively. The flame retardancy and light shieldability of the woven fabric were then evaluated. Workability and physical properties are shown in Table 2.

TABLE 2

|  | Example 4 | Comp. Example 7 |
|---|---|---|
| Polymer preparation | Example 1 | Comp. Example 5 |
| Strength (g/d) | 4.21 | 4.18 |
| Elongation (%) | 34 | 38 |
| Workability | ◎ | ◎ |
| Light shieldability (%) | 99.8 | 91.2 |
| Flame retardancy (LOI) | 31 | 31 |

Example 6

The partially oriented yarns prepared in Example 5 were false twisted at a draw ratio of 1.86, a belt velocity ratio (VR) of 1.50 and a temperature of 160° C., thereby obtaining false twist yarns of 75 denier/72 filaments. The thus-prepared fibers and conventional flame retardant polyester 75 denier/36 filament yarns, as weft and warp, respectively, were used to weave fabrics which were then evaluated on flame retardancy and light shieldability. The results are as follows:

Strength: 4.5 g/d
Elongation: 28%
Shading rate: 99.8%
LOI: 31

Example 7

False twisted yarns of 75 denier/72 filaments prepared in Example 6 and commercially available flame retardant polyester false twisted yarns, SGM 300 denier/96 filaments (Hyosung, Korea), as warp and weft, respectively, were used to weave 7 double faced satins which were then evaluated on performance as a blackout curtain.

Flame retardancy of the blackout curtain was evaluated according to Korean Standard, KS M 3032, and the blackout curtain passed the examination. In addition, the shading rate of the blackout curtain was evaluated according to Japanese Standard, JIS L 1055, and was found to be 99.9%.

As described above, polyester fibers in accordance with the present invention can be prepared by conventional spinning methods and techniques typically used in conventional polyester fiber manufacturing, have permanent flame retardancy and light shieldability and are applicable to various fiber products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polyester fiber which simultaneously possesses flame retardancy and light-shielding properties, and thereby stability to UV light, said polyester fiber comprising 0.05 to 5% by weight of a phosphorus based flame retardant, based on phosphorus atoms, 1 to 5% by weight of inorganic fine particles relative to the weight of the fiber for providing light-shielding properties in the polyester fiber, said inorganic fine particles having a particle size distribution which satisfy the following inequality (1):

$$0.05 \text{ μm} \leq d_{50} \leq 1 \text{ μm}, B_{90/10} \leq 0.5 \text{ μm} \quad [1]$$

wherein $d_{50}$ is an average particle diameter of inorganic fine particles, and $B_{90/10}$ is a difference in the particle diameter between the top 90% of total particle diameters and the bottom 10% of total particle diameters and manganese phosphate as a UV stabilizer, said manganese phosphate being synthesized, by the in sitsu reaction of manganese acetate and phosphoric acid.

2. The polyester fiber of claim 1 wherein the manganese phosphate is present in an amount of 0.1 to 500 ppm.

3. The polyester fiber of claim 1, wherein polyester polymers used to prepare the polyester fiber have an intrinsic viscosity of 0.55 to 0.75 dl/g.

4. The polyester fiber of claim 1, wherein the phosphorus-based flame retardant is a side-chain flame retardant in which the phosphorus atoms are attached to polyester backbones via side chains.

* * * * *